United States Patent [19]
Kang et al.

[11] Patent Number: 5,580,506
[45] Date of Patent: Dec. 3, 1996

[54] METHOD FOR MAKING STRONTIUM TITANATE BASED GRAIN-BOUNDARY BARRIER LAYER CAPACITOR

[75] Inventors: Suk-Joong L. Kang, Daejon; Jae H. Jeon, Pusan; Beoung D. You, Daejon, all of Rep. of Korea

[73] Assignee: Agency for Defense Development, Daejon, Rep. of Korea

[21] Appl. No.: 340,736

[22] Filed: Nov. 16, 1994

[30] Foreign Application Priority Data

Nov. 16, 1993 [KR] Rep. of Korea ................ 1993-24313

[51] Int. Cl.⁶ ................................................ B05D 5/12
[52] U.S. Cl. .................................... 264/61; 427/126.2
[58] Field of Search ............................ 264/61, 65, 66; 427/126.2, 126.3

[56] References Cited

U.S. PATENT DOCUMENTS

| | | | |
|---|---|---|---|
| 4,309,295 | 1/1982 | McSweeney | 252/62.3 |
| 4,323,617 | 4/1982 | Mandai et al. | 428/148 |
| 4,397,886 | 8/1983 | Neirman et al. | 427/80 |
| 4,419,310 | 12/1983 | Burn et al. | 264/59 |
| 4,579,594 | 4/1986 | Nanao et al. | 106/287.24 |
| 4,761,711 | 8/1988 | Hiremath et al. | 361/321 |

OTHER PUBLICATIONS

Franken et al., "Microstructure of $SrTiO_3$ Boundary–Layer Capacitor Material", *J. of American Ceramic Society*, vol. 64, No. 12, pp. 687–690 (1981).

Fujimoto et al., "Microstructures of $SrTiO_3$ Internal Boundary Layer Capacitors During and After Processing and Resultant Electrical Properties", *J. of American Ceramic Society*, vol. 68, No. 4, pp. 169–173 (1985).

*Primary Examiner*—Christopher A. Fiorilla
*Attorney, Agent, or Firm*—Scully, Scott, Murphy & Presser

[57] ABSTRACT

There is a method for making a strontium titanate based Grain-Boundary Barrier Layer Capacitors (GBBLC) with improved dielectric properties by introducing an intermediate step of heat-treatment in an oxidizing atmosphere between sintering of a strontium titanate based powder in a reducing atmosphere and an infiltration of the obtained sintered body with a metal oxide.

5 Claims, No Drawings

METHOD FOR MAKING STRONTIUM TITANATE BASED GRAIN-BOUNDARY BARRIER LAYER CAPACITOR

BACKGROUND OF THE INVENTION

1. Field of the Invention

The present invention relates to a method for making a strontium titanate based Grain-Boundary Barrier Layer Capacitor (GBBLC). More particularly, it relates to a method for making strontium titanate based GBBLC with improved dielectric properties by introducing an additional heat-treatment step during the fabrication process.

2. Description of the Prior Art

There have been efforts to develop capacitors to meet high capacitance and small size needed for low voltage circuitry. Strontium titanate based GBBLC has a high dielectric constant because the thin grain boundary barrier layers formed between semiconductive grains function as dielectric layers. Thus strontium titanate based GBBLC is a passive component widely applied to electronic circuits. Strontium titanate based GBBLC is prepared by sintering a powder mixture of strontium titanate and n-type dopants, such as $Nb_2O_5$ and $La_2O_3$ [See, M. Fujimoto and W. D. Kingery, J. Am. Ceram. Soc., 68[4] 169–73 (1985)] in a reducing atmosphere, and coating the sintered bodies with powdery metal oxides with low melting points, such as PbO, $Bi_2O_3$, and CuO, and then annealing the coated bodies in an oxidizing atmosphere to form a thin insulating layer between $SrTiO_3$ grains [See, Franken et al., J. Am. Ceram. Soc., 64[12], 687(1981)]. This fabrication process leads to a very high effective dielectric constant. The electronic properties of strontium titanate based GBBLC thus strongly depend on the sintering and annealing conditions. Previous methods of making strontium titanate based GBBLC consists of sintering power compacts in a reducing atmosphere and infiltrating an oxide liquid glass into the sintered compacts in air.

SUMMARY OF THE INVENTION

The purpose of the present invention is to provide an advanced process of making strontium titanate based GBBLC with high effective dielectric-constant. The present invention is directed to an additional heat-treatment step of the sintered body in an oxidizing atmosphere before liquid infiltration.

DETAILED DESCRIPTION OF THE INVENTION

According to the present invention, the effective dielectric constant of GBBLC has been improved by introducing an intermediate step of heat-treatment in an oxidizing atmosphere between the sintering in a reducing atmosphere and the oxide infiltration in an oxidizing atmosphere.

The intermediate heat-treatment can be accomplished by reheating and annealing the specimen which was sintered in a reducing atmosphere in an oxidizing atmosphere. Another method of the intermediate heat-treatment is to replace the sintering atmosphere from a reducing atmosphere to an oxidizing atmosphere and then to anneal the compact at the end of the sintering cycle. After the intermediate heat-treatment in an oxidizing atmosphere, oxide infiltration is done in air according to conventional methods.

The process of the present invention is illustrated in more detail as follows:

1) To make compacts of doped strontium titanate powder with dopants such as $Nb_2O_5$, and to sinter the compacts at about 1400° C. to about 1500° C. for about 2 to about 7 hrs in a reducing atmosphere, such as a mixture of hydrogen and nitrogen, 2) After cooling the sintered specimen to room temperature, to reheat the specimen above about 1200° C. for up to about 4 hrs in an oxidizing atmosphere comprising air or oxygen. Alternatively, after sintering, to replace the reducing atmosphere with an oxidizing atmosphere comprising air or oxygen in the condition of at above about 1200 ° C. and for up to about 4 hrs before cooling to room temperature, 3) To infiltrate a low melting point oxide glass, such as CuO, PbO, $Bi_2O_3$, and $MnO_2$, at about 900° C. to about 1300° C. in air into the heat-treated specimen.

The present invention will be illustrated in great detail by way of the following example. The example is presented for illustrative purpose only and should not be construed as limiting the invention which is properly delineated in the claims.

EXAMPLE 1

A group of specimens were prepared by the following procedures. Strontium titanate powder compacts doped with 0.2 mol% $Nb_2O_5$ were sintered at 1480° C. for 5 h in a $5H_2+95N_2$ atmosphere. After cooling to room temperature, the specimens were reheated at 1200° C. to 1480° C. and annealed for 1 rain to 4 hrs in air. For the purpose of comparison, a standard specimen without heat-treatment was prepared by infiltrating CuO into the specimen sintered at 1480 ° C. for 5 hrs in a $5H_2+95N_2$ atmosphere. The heat-treated specimens and a standard specimen were infiltrated with CuO at 1200° C. for 1 hr in air. CuO-infiltrated specimens were pasted with an In-Ga electrodes alloy, and dielectric properties were measured by an impedance/gain-phase analyzer from 1 KHz to 1 MHz.

The results are shown in Table 1 below.

EXAMPLE 2

The second group of specimens were prepared by the following procedures. Strontium titanate powder compacts doped with 0.2 mol% $Nb_2O_5$ were sintered at 1480 ° C. for 5 hrs in a $5H_2+95N_2$ atmosphere. Afterwards, the sintering atmosphere of $5H_2+95N_2$ was replaced with air or oxygen at 1200° C. to 1480° C. and annealed for 1 min to 4 hrs before cooling to room temperature. The heat-treated specimens were infiltrated with CuO at 1200° C. for 1 h in air. CuO-infiltrated specimens were pasted with an In-Ga electrodes alloy, and the dielectric property was measured by an impedance/gain-phase analyzer from 1 KHz to 1 MHz.

The results are shown in Table 1 below. As can be seen from Table 1, the effective dielectric constant was increased remarkably and the dielectric loss decreased by introducing the heat-treatment, compared with that of the standard specimen without heat-treatment.

TABLE 1

Dielectric Properties of Strontium Titanate Based GBBLC with Intermediate Heat-treatment

| Heat-Treatment Method | Heat-Treatment Condition | Effective Dielectric Constant, $k_{eff}$ | | | | Dielectric Loss, $\tan\delta(\%)$ | | | |
|---|---|---|---|---|---|---|---|---|---|
| | | 1 KHz | 10 KHz | 100 KHz | 1 MHz | 1 KHz | 10 KHz | 100 KHz | 1 MHz |
| after Sintering Cycle | 1200° C., air, 4 hr | 22,700 | 20,600 | 18,700 | 16,800 | 6.36 | 6.66 | 7.77 | 13.07 |
| | 1300° C., air, 2 hr | 23,700 | 24,800 | 22,300 | 20,400 | 7.68 | 7.74 | 7.60 | 11.98 |
| | 1400° C., air, 1 hr | 34,300 | 30,200 | 25,800 | 21,700 | 9.30 | 9.38 | 12.62 | 22.74 |
| | 1480° C., air, 5 min | 24,400 | 21,200 | 18,200 | 13,300 | 9.82 | 9.81 | 14.57 | 16.56 |
| | 1480° C., air, 0 hr | 23,900 | 20,500 | 17,500 | 12,900 | 9.16 | 10.70 | 14.69 | 15.77 |
| during Sintering Cycle | 1200° C., air, 4 hr | 21,900 | 19,100 | 18,200 | 16,400 | 8.67 | 9.84 | 10.88 | 14.89 |
| | 1400° C., air, 1 hr | 38,800 | 34,700 | 32,200 | 30,500 | 8.38 | 6.35 | 5.55 | 8.89 |
| | 1400° C., air, 1 hr | 28,800 | 25,400 | 23,000 | 20,200 | 11.22 | 8.73 | 7.99 | 16.58 |
| | 1480° C., air, 1 hr | 31,100 | 28,400 | 25,500 | 22,300 | 9.89 | 10.29 | 12.05 | 14.52 |
| | 1480° C., air, 0.5 hr | 36,600 | 32,100 | 29,500 | 27,800 | 7.97 | 6.85 | 6.04 | 11.55 |
| | 1480° C., air, 0 hr | 15,500 | 12,800 | 11,300 | 9,800 | 8.24 | 11.12 | 16.07 | 16.67 |
| Standard Specimen without Heat-Treatment | | 13,800 | 11,600 | 9,100 | 7,300 | 10.00 | 14.12 | 16.45 | 16.01 |

What is claimed is:

1. A method for making a strontium titanate based grain-boundary barrier layer capacitor comprising the steps of:
    (a) sintering a strontium titanate based powder in a reducing atmosphere to obtain a sintered body;
    (b) heating the sintered body at a temperature of above 1200° C. in an oxidizing atmosphere; and
    (c) infiltrating the heated body, in air, with at least one metal oxide at a temperature of from 900° C. to 1300° C.

2. The method according to claim 1, wherein the heating is carried out at a temperature above 1200 ° C. for 1 min to 4 hours after cooling the sintered body.

3. The method according to claim 1, wherein said oxidizing atmosphere comprises air.

4. The method according to claim 1, wherein said oxidizing atmosphere comprises oxygen.

5. A method for making a strontium titanate based grain-boundary barrier layer capacitor comprising the steps of:
    (a) sintering a strontium titanate based powder in a reducing atmosphere to obtain a sintered body;
    (b) annealing the sintered body in an oxidizing atmosphere at a temperature of above 1200° C. without cooling the sintered body; and
    (c) infiltrating the annealed body, in air, with at least one metal oxide at a temperature of from 900° C. to 1300° C.

* * * * *

UNITED STATES PATENT AND TRADEMARK OFFICE
CERTIFICATE OF CORRECTION

PATENT NO. : 5,580,506
DATED : December 3, 1996
INVENTOR(S) : Suk-Joong L. Kang, et al.

It is certified that error appears in the above-indentified patent and that said Letters Patent is hereby corrected as shown below:

Column 2, line 34: "rain" should read --min--

Column 3, line 9: "23,700" should read --27,700--

Column 3, line 15: "1400° C., air, 1 hr" should read --1400° C., $O_2$, 1 hr--

Column 3, lines 32-34, Claim 2: delete "The method according to claim 1, wherein the heating is carried out at a temperature above 1200° C. for 1 min to 4 hours after cooling the sintered body." and insert --The method according to Claim 1, wherein said heating step (b) is carried out for 1 min. to 4 hours after cooling the sintered body.--

UNITED STATES PATENT AND TRADEMARK OFFICE
CERTIFICATE OF CORRECTION

PATENT NO. : 5,580,506
DATED : December 3, 1996
INVENTOR(S) : Suk-Joong L. Kang, et al.

It is certified that error appears in the above-indentified patent and that said Letters Patent is hereby corrected as shown below:

Column 3, lines 32-34, Claim 2: delete "The method according to claim 1, wherein the heating is carried out at a temperature above 1200° C. for 1 min to 4 hours after cooling the sintered body." and insert --The method according to Claim 1, wherein said heating step (b) is carried out for 1 min. to 4 hours after cooling the sintered body.--

Signed and Sealed this

Twenty-sixth Day of August, 1997

Attest:

BRUCE LEHMAN

Attesting Officer

Commissioner of Patents and Trademarks